(12) United States Patent
Shichino

(10) Patent No.: US 11,515,740 B2
(45) Date of Patent: Nov. 29, 2022

(54) POWER RECEIVING APPARATUS, CONTROL METHOD OF POWER RECEIVING APPARATUS AND STORAGE MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/201,670

(22) Filed: Mar. 15, 2021

(65) Prior Publication Data

US 2021/0296941 A1    Sep. 23, 2021

(30) Foreign Application Priority Data

Mar. 19, 2020  (JP) .............................. JP2020-049939

(51) Int. Cl.
| | | |
|---|---|---|
| *H02J 50/80* | (2016.01) | |
| *H02J 50/90* | (2016.01) | |
| *H02J 50/10* | (2016.01) | |
| *H02J 50/60* | (2016.01) | |

(52) U.S. Cl.
CPC .............. *H02J 50/80* (2016.02); *H02J 50/10* (2016.02); *H02J 50/60* (2016.02); *H02J 50/90* (2016.02)

(58) Field of Classification Search
CPC .. H02J 50/80; H02J 50/10; H02J 50/60; H02J 50/90
See application file for complete search history.

(56) References Cited

U.S. PATENT DOCUMENTS

| | | | |
|---|---|---|---|
| 11,086,042 B2* | 8/2021 | Park ..................... | H02J 7/00034 |
| 2011/0270561 A1* | 11/2011 | Gregg .................. | G01R 35/005 |
| | | | 702/82 |
| 2014/0111154 A1* | 4/2014 | Roy ....................... | H02J 50/90 |
| | | | 320/108 |

(Continued)

FOREIGN PATENT DOCUMENTS

JP          2017-070074 A        4/2017

*Primary Examiner* — Pinping Sun
(74) *Attorney, Agent, or Firm* — Canon U.S.A., Inc. IP Division

(57) ABSTRACT

A power receiving apparatus includes a measurement unit that measures a first received voltage value from a power transmitting apparatus, which has a detection function for detecting an object as being different from a power receiving apparatus, based on a difference between power transmitted by the power transmitting apparatus and power received by the power receiving apparatus, as well as a first request unit that requests the power transmitting apparatus to adjust the transmitted power, a measurement unit that measures a second received voltage value from the power transmitting apparatus after the requesting, a determination unit that determines whether calibration process regarding the detection function is necessary, based on details of an adjustment of the transmitted power and the difference between the first and second received voltage values, and a request unit that requests the power transmitting apparatus to terminate power transmission and requests the power transmitting apparatus to perform the calibration process if the calibration process is necessary.

14 Claims, 4 Drawing Sheets

(56) References Cited

U.S. PATENT DOCUMENTS

| | | | |
|---|---|---|---|
| 2014/0339916 A1* | 11/2014 | Fells | H02J 50/12 |
| | | | 307/104 |
| 2016/0301259 A1* | 10/2016 | Zeine | H02J 50/80 |
| 2017/0040843 A1* | 2/2017 | Asanuma | H02J 7/027 |
| 2017/0093214 A1* | 3/2017 | Watanabe | H02J 7/025 |
| 2018/0092048 A1* | 3/2018 | Cheng | H04B 17/13 |
| 2018/0366994 A1* | 12/2018 | Meichle | H02J 50/80 |
| 2020/0094697 A1* | 3/2020 | Nagata | H02J 50/60 |
| 2021/0036555 A1* | 2/2021 | Park | H04L 29/06 |
| 2021/0057925 A1* | 2/2021 | Komoriya | H02J 7/00045 |
| 2021/0384769 A1* | 12/2021 | Staring | H02J 50/60 |

* cited by examiner

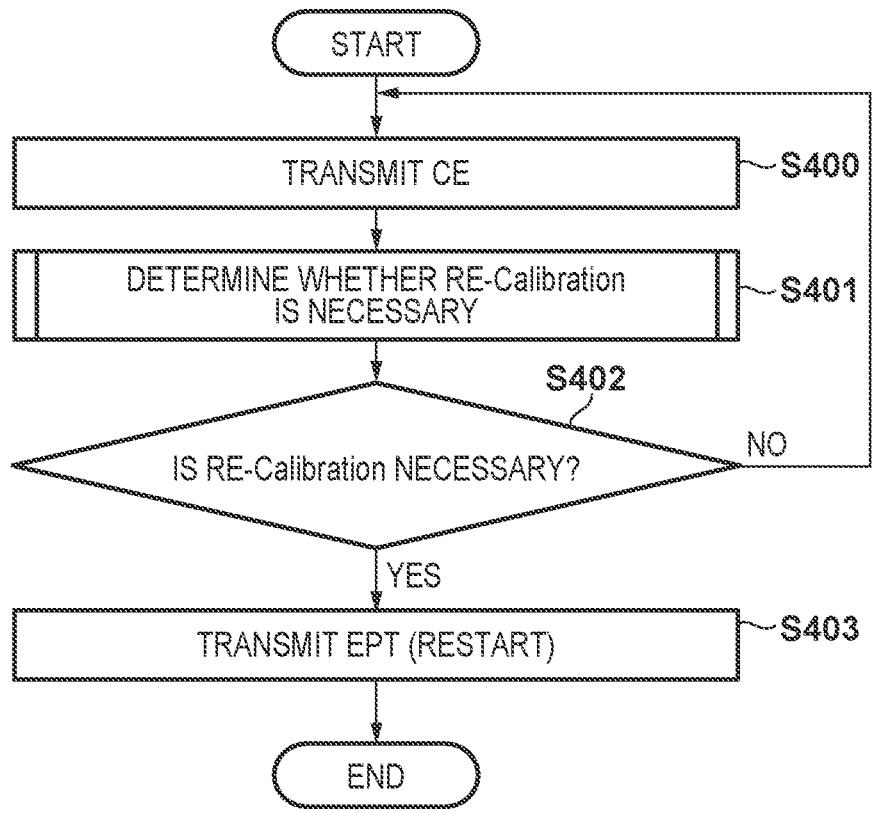

POWER RECEIVING APPARATUS, CONTROL METHOD OF POWER RECEIVING APPARATUS AND STORAGE MEDIUM

BACKGROUND

Field

The present disclosure relates to a power receiving apparatus, a control method of the power receiving apparatus and a storage medium.

Description of the Related Art

Technical development of wireless power transfer systems is widely ongoing. Japanese Patent Laid-Open No. 2017-70074 discloses a power transmitting apparatus and a power receiving apparatus conforming to a standard (WPC standard) defined by the Wireless Power Consortium (WPC), which is a standardizing body for a wireless charging standard. Japanese Patent Laid-Open No. 2017-70074 discloses, as a foreign object detection method in a power transmitting apparatus, an approach of determining the existence of a foreign object in a case where the difference between the transmitted power and the received power (power loss) has exceeded a threshold value. A foreign object refers to an object which is different from the power receiving apparatus.

In a foreign object detection method based on power loss, it is necessary to preliminarily generate data indicating a relationship between the transmitted power and the received power. However, in a case where the power transmitting apparatus has generated data indicating the relationship between the transmitted power and the received power, in a state where a foreign object is present in the vicinity of the power transmitting apparatus and the power receiving apparatus, performing foreign object detection using the data may not successfully detect a foreign object with a high precision causing problems with foreign object detection.

SUMMARY

Various embodiments of the present disclosure, provide improved techniques for foreign object detection in wireless power transfer. They provide more precise detection of an object which is different from the power receiving apparatus.

According to various embodiments of the present disclosure, a power receiving apparatus is provided which includes a first measurement unit configured to measure a first received voltage value based on power wirelessly received from a power transmitting apparatus. The power transmitting apparatus has a detection function for detecting an object as being different from a power receiving apparatus, based on a difference between power transmitted by the power transmitting apparatus and power received by the power receiving apparatus. The power receiving apparatus further includes a first request unit configured to request the power transmitting apparatus to adjust the transmitted power, a second measurement unit configured to measure a second received voltage value based on power received from the power transmitting apparatus after the request by the first request unit is sent, a determination unit configured to determine whether or not a calibration process pertaining to the detection function is necessary, based on details of an adjustment of the transmitted power and the difference between the first received voltage value and the second received voltage value, and a second request unit configured to request the power transmitting apparatus to terminate power transmission and to request the power transmitting apparatus to perform the calibration process, in a case where the calibration process is determined to be necessary.

Further features of the present disclosure will become apparent from the following description of exemplary embodiments (with reference to the attached drawings).

BRIEF DESCRIPTION OF THE DRAWINGS

FIG. 4 is a flowchart illustrating a procedure of a process executed by a determination unit of a power receiving apparatus according to an embodiment;

FIG. 5 is a conceptual diagram pertaining to determination by a determination unit of a power receiving apparatus according to an embodiment;

DESCRIPTION OF THE EMBODIMENTS

Figure 1:
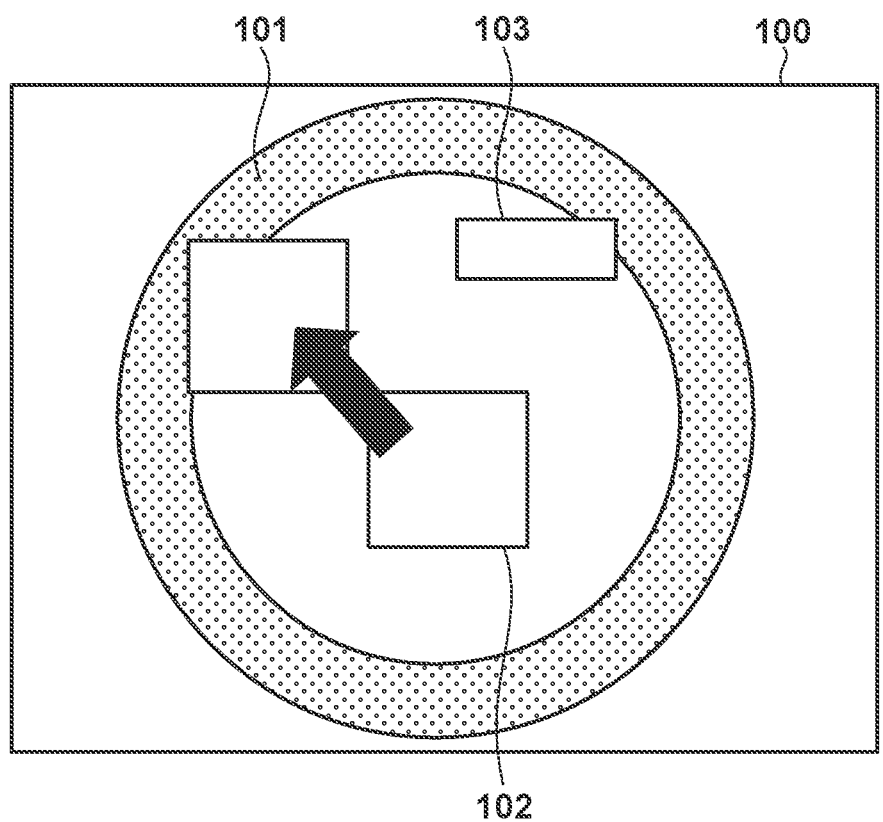
FIG. 1 is a configuration diagram of a wireless power transfer system according to an embodiment.

Hereinafter, some exemplary embodiments will be described in detail with reference to the attached drawings. Note, the following example embodiments are not intended to limit the scope of the disclosure, and limitation is not made to restrict the invention to embodiments that require a combination of all features described in the embodiments. Two or more of the multiple features described in the embodiments may be combined as appropriate. Furthermore, as between the Figures, in some cases, the same reference numerals were given to the same or similar configurations, and in those cases, redundant description thereof is omitted in the corresponding description of those Figures herein below.

<Foreign Object Detection Method Based on Difference Between Transmitted Power and Received Power (Power Loss)>

Figure 7A:
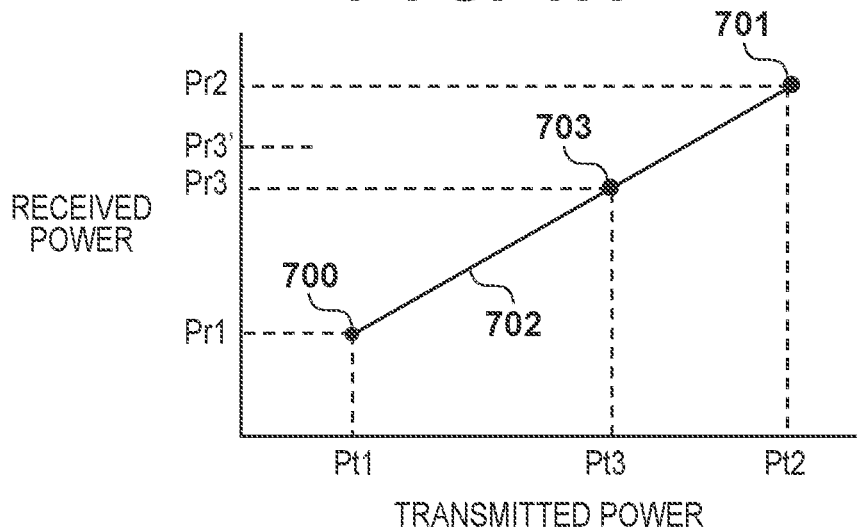
FIGS. 7A and 7B illustrate graphs pertaining to a power-loss-based foreign object detection process according to an embodiment.

First, there will be described a power-loss-based foreign object detection method defined in the WPC standard, referring to FIG. 7A. The horizontal axis in FIG. 7A indicates power transmitted by a power transmitting apparatus, and the vertical axis indicates power received by a power receiving apparatus.

The power transmitting apparatus receives, from the power receiving apparatus, a received power value Pr1 (referred to as Light Load) when the power received by the power receiving apparatus is not supplied to a load (such as a charging circuit or a battery). The power transmitting apparatus then stores a transmitted power value PO of that moment (point 700). Subsequently, the power transmitting apparatus receives, from the power receiving apparatus, a received power value Pr2 (referred to as Connected Load) when the power received by the power receiving apparatus is supplied to the load. The power transmitting apparatus then stores the transmitted power value Pt2 of that moment (point 701).

The power transmitting apparatus then performs linear interpolation between the point 700 and the point 701 to form a straight line 702. The straight line 702 indicates a relation between the transmitted power and the received power with a state of no foreign object existing in the vicinity of the power transmitting apparatus and the power receiving apparatus. The power transmitting apparatus can predict, from the transmitted power value and the straight line 702, the value of the power to be received in a state of the absence of a foreign object. For example, when the transmitted power value is Pt3, it is possible to predict, from a point 703 on straight line 702 indicating the transmitted power value Pt3, that the value of the power to be received is Pr3.

Here, it is assumed that the power transmitting apparatus has received a received power value Pr3' from the power receiving apparatus. The power transmitting apparatus calculates a value Pr3−Pr3' (=Ploss) by subtracting, from the received power value Pr3 in a state of the absence of a foreign object, the actually received power value Pr3' from the power receiving apparatus. Subsequently, it is determined that a foreign object exists in a case where the power Ploss, which is supposed to be consumed by the foreign object, has exceeded a predetermined threshold value. The foregoing has provided an explanation of power-loss-based foreign object detection.

<Configuration of Wireless Power Transfer System>

FIG. 1 is a configuration diagram of a wireless power transfer system according to the present embodiment. The system, in an example, is configured to include a power receiving apparatus (RX) 102 and a power transmitting apparatus (TX) 100. The power receiving apparatus 102 is an electronic device that receives power from the power transmitting apparatus 100 and charges a built-in battery. The power transmitting apparatus 100 is an electronic device that wirelessly transmits power to the power receiving apparatus 102 mounted thereon. Reference numeral 101 denotes a power transmitting coil 101 of the power transmitting apparatus 100. The power transmitting apparatus 100 wirelessly transmits power to the power receiving apparatus 102 via the power transmitting coil 101.

Additionally, reference numeral 103 denotes an electrically conductive foreign object. The foreign object exists in a range (an operating volume), i.e. a transmitting range, which is affected by the wireless power transmitted from the power transmitting coil 101. In addition, the black arrow indicates that the power receiving apparatus 102 moves over the power transmitting apparatus 100, thus the positional relation between the power transmitting coil 101 and the power receiving coil (not illustrated in FIG. 1) of the power receiving apparatus 102 changes before and after the movement.

<Configuration of Power Receiving Apparatus>

Figure 2:
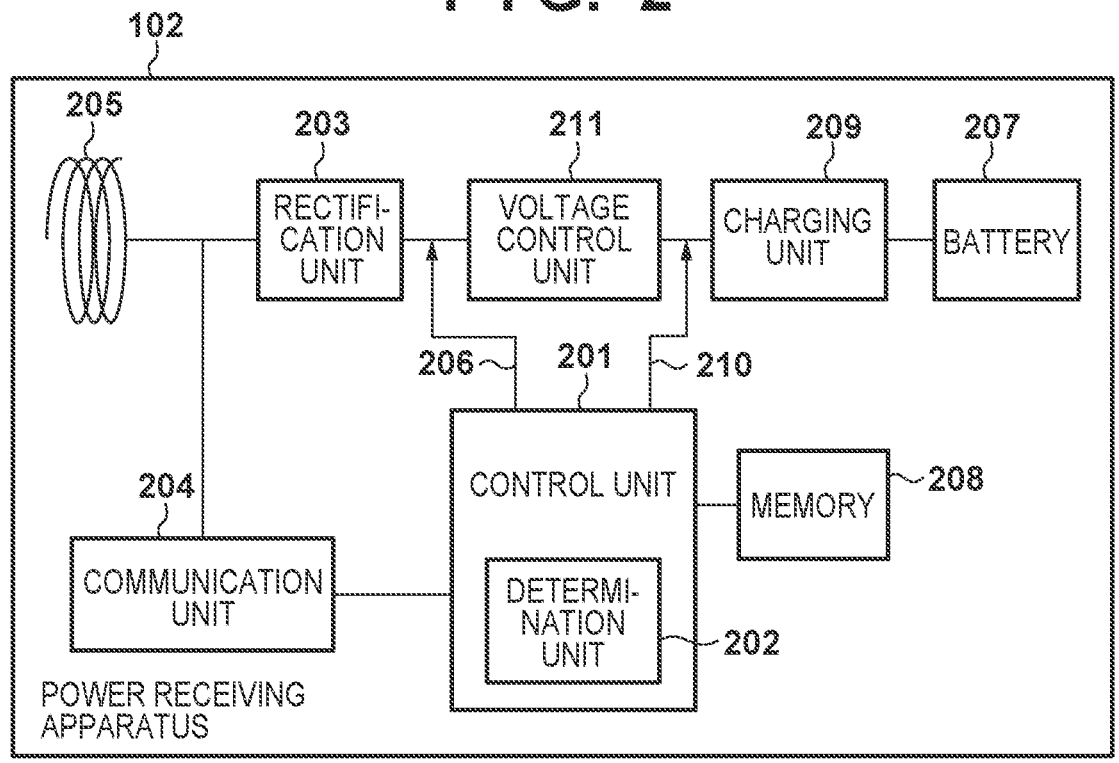
FIG. 2 is a configuration diagram of a power receiving apparatus according to an embodiment.

FIG. 2 illustrates a configuration example of the power receiving apparatus 102 according to the present embodiment. It is assumed that the power receiving apparatus 102 conforms to the WPC standard. The power receiving apparatus 102 includes a control unit 201, a rectification unit 203, a communication unit 204, a power receiving coil 205, a battery 207, a memory 208, a charging unit 209, and a voltage control unit 211. The control unit 201 includes a determination unit 202.

The control unit 201 controls the entire power receiving apparatus 102. A Central Processing Unit (CPU) is an example of the control unit 201. The control unit 201 has a function (arrow 206) for measuring a direct current voltage Vrect (received voltage value based on received power) that is output by the rectification unit 203 to the voltage control unit 211. In addition, the control unit 201 has a function (arrow 210) for measuring power consumption of a load (the charging unit 209 and the battery 207) by observing the output voltage and the output current of the voltage control unit 211.

The determination unit 202 has a function of determining whether a foreign object exists or the power receiving apparatus 102 has moved over the power transmitting apparatus 100. Details of the determination unit 202 will be described below. The rectification unit 203 converts alternating voltage and alternating current received from the power transmitting coil 101 via the power receiving coil 205 into direct current voltage and direct current that drive the control unit 201, the voltage control unit 211, the charging unit 209, or the like. The rectification unit 203 according to the present embodiment is intended to supply power for the charging unit 209 to charge the battery 207.

The communication unit 204 performs control communication of wireless charging based on the WPC standard, to and from a communication unit (not illustrated) of the power transmitting apparatus 100. The control communication is performed by load modulation of electromagnetic waves received by the power receiving coil 205. The power receiving coil 205 receives alternating voltage and alternating current from the power transmitting coil 101.

The memory 208 stores determination conditions for determination to be made by the determination unit 202. The memory 208 stores a program that causes the control unit 201 to operate the power receiving apparatus 102 according to the present embodiment. The charging unit 209 charges the battery 207. The voltage control unit 211 operates at the direct current voltage rectified by the rectification unit 203, and supplies a predetermined constant voltage to the charging unit 209.

Here, the power receiving apparatus 102 may be configured to be built in another device (camera, smartphone, tablet PC, laptop, automobile, robot, medical device, printer, etc.). In addition, although the control unit 201, the rectification unit 203, the communication unit 204, the voltage control unit 211, and the memory 208 are described as separate bodies in FIG. 2, arbitrary ones of the foregoing elements may be implemented in a same chip.

In addition, the wireless power transfer method conformed by the power transmitting apparatus 100 and the power receiving apparatus 102 is not limited to the method defined by the WPC standard, and there may be employed other methods using electromagnetic induction, magnetic field resonance, electric field resonance, microwave, laser, or the like. In addition, although the present embodiment intends to use wireless power transmission for wireless charging, wireless power transmission may be performed for purposes other than wireless charging. In addition, there may also be a configuration in which the voltage, output by from the rectifying unit 203 to the voltage control unit 211, directly drives a circuit (not illustrated) without being stored in the battery.

<Sequence of Power Transmitting Apparatus and Power Receiving Apparatus>

Figure 3A:
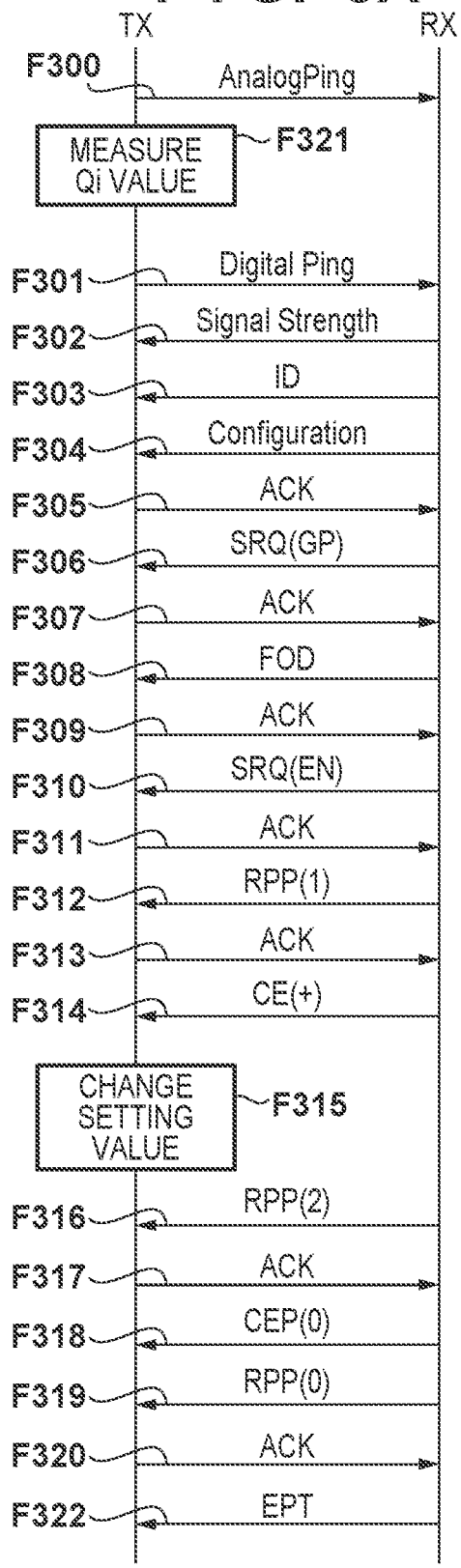
FIGS. 3A to 3C are sequential diagrams of a power transmitting apparatus and a power receiving apparatus according to an embodiment.

Next, there will be described a sequence of the power transmitting apparatus and the power receiving apparatus according to the present embodiment, referring to FIGS. 3A to 3C. FIG. 3A illustrates an operation of the power transmitting apparatus 100 (TX in the drawing) and the power receiving apparatus 102 (RX in the drawing) defined in the WPC standard.

Upon the power transmitting apparatus 100 being activated, the power transmitting apparatus 100 intermittently transmits an Analog Ping via the power transmitting coil 101 (F300). The Analog Ping is a weak power signal for detecting an object existing in the vicinity of the power transmitting coil 101. While the power receiving apparatus 102 is receiving the Analog Ping, the power transmitting apparatus 100 is in a state referred to as Selection phase.

The power transmitting apparatus 100 detects a variation of the voltage value, the current value or the resonant frequency of the power transmitting coil 101 at the time of transmitting the Analog Ping, determines that an object exists around the power transmitting coil 101 when the variation exceeds a certain threshold, and performs Qi value measurement (F321).

The Qi value measurement refers to measuring the Qi value of the power transmitting coil 101. The measured Qi value is used for Qi-value-based foreign object detection described below. After having performed Qi value measurement, the power transmitting apparatus 100 transitions to the Ping phase.

In the Ping phase, the power transmitting apparatus 100 transmits a Digital Ping, which is a stronger output than the Analog Ping (F301). The output strength of the digital Ping provides sufficient power to activate at least the control unit 201 of the power receiving apparatus 102 existing in the vicinity of the power transmitting coil 101.

The control unit 201 of the power receiving apparatus 102, upon being activated by the power received via the power receiving coil 205, notifies the power transmitting apparatus 100 of a Signal Strength indicating the strength of the received voltage (F302). Accordingly, the power receiving apparatus 102 transitions to an Identification & Configuration phase (referred to as I&C phase below). Upon receiving the Signal Strength from the power receiving apparatus 102, the power transmitting apparatus 100 transitions to the I&C phase.

Subsequently, the power receiving apparatus 102 transmits, to the power transmitting apparatus 100, an ID packet (F303) including a manufacturer code indicating the manufacturer thereof and device identification information, and a Configuration Packet (F304) including a standard version or the like to which the power receiving apparatus 102 conforms.

The power transmitting apparatus 100, upon receiving the Configuration Packet and when the standard version to which the power receiving apparatus 200 conforms is equal to or above a predetermined version (e.g., a version equal to or above v1.2.2), transmits, to the power receiving apparatus 102, an ACK indicating that the information included in the Configuration Packet has been granted, and transitions to the Negotiation phase. Similarly, the power receiving apparatus 102 transitions to the Negotiation phase upon receiving the ACK.

In the Negotiation phase, the power transmitting apparatus 100 and the power receiving apparatus 200 perform negotiation in order to determine Guaranteed Power (referred to as GP below) indicating the strength of power that can be securely received by the power receiving apparatus 200. Specifically, the power receiving apparatus 102 contains a value, which is required as the GP, in an SRQ(GP) packet, which is a packet for requesting the GP, among Specific Request (referred to as SRQ below) packets, and transmits the SRQ(GP) packet to the power transmitting apparatus 100 (F306).

The power transmitting apparatus 100 then grants or refuses the request. Here, the power transmitting apparatus 100 transmits an ACK packet granting the request to the power receiving apparatus 102 (F307).

Upon determination of a GP, the power receiving apparatus 102 transmits, to the power transmitting apparatus 100, information pertaining to a foreign object detection function based on the Qi value. Specifically, the Qi value of the power transmitting coil 101 of the power transmitting apparatus 100 with the power receiving apparatus 102 being mounted on the power transmitting apparatus 100 defined in the WPC standard is contained in a Foreign Object Detection Status Packet (referred to as "FOD packet" below) as Q_report, and transmitted to the power transmitting apparatus 100 (F308).

Upon receiving the FOD packet, the power transmitting apparatus 100 determines whether or not a foreign object exists in a range affected by transmitted power based on the Qi value measured at F321 and the Q_report. Here, it is assumed that the power transmitting apparatus 100 transmits, to the power receiving apparatus 102, an ACK indicating that a foreign object is not determined to exist (F309).

Upon receiving the ACK, the power receiving apparatus 102 transmits (F310), to the power transmitting apparatus 100, an End Negotiation packet (SRQ(EN)), among the SRQs, indicating that the Negotiation phase is to be terminated (F310).

The power transmitting apparatus 100 transmits an ACK corresponding to the SRQ(EN) (F311) and terminates the Negotiation phase.

Subsequently, the power transmitting apparatus 100 and the power receiving apparatus 102 execute a Calibration process pertaining to the foreign object detection function based on power loss. In the Calibration process, a straight line 702 described in reference to FIG. 7A is generated. In the following, a specific procedure will be described.

The power receiving apparatus 102 transmits (F312), to the power transmitting apparatus 100 as a Received Power Packet (mode1) (referred to as RPP(1) below), the power received in mode 1 that is a state where the output of the voltage control unit 211 is not supplied to the load (such as the charging unit 209 and the battery 207). The received power value of that moment is denoted Pr1.

The power transmitting apparatus 100 measures the transmitted power inside the power transmitting apparatus 100 at the time of receiving the RPP(1). The transmitted power value of that moment is denoted Pt1. After having transmitted the ACK to the power receiving apparatus 102 (F313), the power transmitting apparatus 100 stores, in a storage unit (not illustrated) inside the power transmitting apparatus 100, a point 700 at which the transmitted power value is Pt1 and the received power value is Pr1 (see FIGS. 7A and 7B).

Upon receiving the ACK (F313), the power receiving apparatus 102 supplies the output of the voltage control 211 to the load (such as the charging unit 209 and the battery 207). Here, the power receiving apparatus 102 transmits (F314) a Control Error Packet (CE packet) requesting the power transmitting apparatus 100 to adjust (increase, in this example) the transmitted power in order to supply power to the load. Note that, in the present embodiment, a CE(+) denotes a case where a Control Error Packet (CEP) indicates increase of the transmitted power, a CE(0) denotes maintaining of the transmitted power, and a CE(−) denotes decrease of the transmitted power. According to this notation, the power receiving apparatus 102 here transmits a CE(+) to the power transmitting apparatus 100 in order to supply power to the load. The power transmitting apparatus 100 changes (F315) the setting value so as to increase the transmitted power based on the CE(+) received from the power receiving apparatus 102.

The power receiving apparatus 102 then transmits (F316), to the power transmitting apparatus 100 as a Received Power Packet (mode2) (referred to as RPP(2) below), a received power value in mode 2 indicating a state where the output of the voltage control unit 211 is supplied to the load (such as the charging unit 209 and the battery 207) and indicating that the Calibration process is ongoing. The received power value of that moment is denoted Pr2.

The power transmitting apparatus 100 measures the transmitted power value inside the power transmitting apparatus 100 at the time of receiving the RPP(2). The transmitted power value of that moment is denoted Pt2. After having transmitted the ACK to the power receiving apparatus 102 (F317), the power transmitting apparatus 100 stores a point 701 (see FIGS. 7A and 7B) at which the transmitted power value is Pt2 and the received power value is Pr2. The power transmitting apparatus 100 then calculates a line connecting the point 700 and the point 701, and defines the line 702 as a determination criterion for determining the presence or absence of a foreign object in power-loss-based foreign object detection.

Upon receiving an ACK corresponding to the RPP(2) from the power transmitting apparatus 100, the power receiving apparatus 102 terminates the Calibration process. The power receiving apparatus 102 then periodically transmits (F318) a CE packet, which is a packet requesting adjustment of transmitted power in accordance with variation of power consumption of the load. The power receiving apparatus 102 periodically transmits RPP to the power transmitting apparatus 100 even after termination of the Calibration process, the power receiving apparatus 102 on this occasion transmits, to the power transmitting apparatus 100, an RPP(0) indicating the received power in mode 0 indicating a state where the output of the voltage control unit 211 is supplied to the load (such as the charging unit 209 and the battery 207), and indicating that the Calibration process is not ongoing.

Upon receiving the RPP(0), the power transmitting apparatus 100 transmits an ACK to the power receiving apparatus 102 (F320). In addition, using the value of power received in the RPP(0) and the line 702, the power transmitting apparatus 100 performs power-loss-based foreign body detection by the method described above referring to FIG. 7A.

Upon completion of charging the battery 207, the power receiving apparatus 102 transmits (F322) an End Power Transfer packet (referred to as EPT below) requesting the power transmitting apparatus 100 to terminate power transmission, and terminates the series of processing.

Figure 7B:
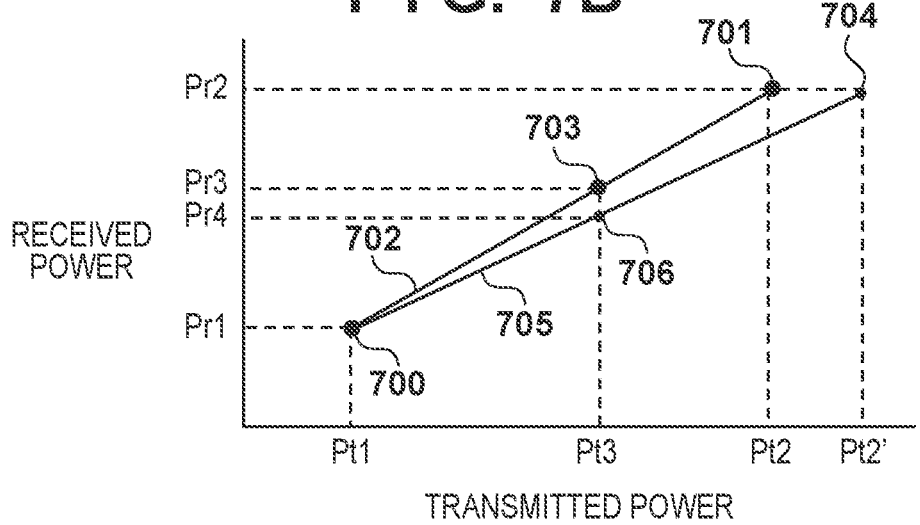

Here, referring to FIG. 7B, there will be described a problem that may arise in a case where a foreign object exists in a range affected by transmitted power while the Calibration process is ongoing. For example, let us assume that a foreign object 103 is placed in a range affected by transmitted power during a time period from when the power transmitting apparatus 100 received the RPP(1) and stored the point 700 to when the power transmitting apparatus 100 receives the RPP(2). Accordingly, at the time when the power transmitting apparatus 100 received the RPP(2) indicating that the received power value of the power receiving apparatus 102 is Pr2, the transmitted power value turns out to be Pt2', which is larger than Pt2 indicating the transmitted power in the absence of a foreign object, as illustrated in FIG. 7B. Here, the difference between Pt2' and Pt2 may be regarded as the power consumed by the foreign object.

Next, the power transmitting apparatus 100 calculates a line 705 connecting the point 700 and a point 704 at which the transmitted power value is Pt2' and the received power value is Pr2, and defines the calculated line 705 as a determination criterion for determining the presence or absence of a foreign object in power-loss-based foreign object detection.

The line 705 generated in the presence of a foreign object is displaced relative to the line 702 generated in a state of the absence of a foreign object. Therefore, in a case where the transmitted power value is Pt3, the power transmitting apparatus 100 calculates, from a point 706 on the straight line 705 indicating that the transmitted power value is Pt3, a received power value of Pr4 (different from Pr3), and predicts the received power value as a received power value in a state of the absence of a foreign object.

As has been described above, in a case where a foreign object exists in the periphery of the power transmitting apparatus 100 and the power receiving apparatus 102 at the stage of generating the straight line 702, a difference of Pr3−Pr4 may arise for the same transmitted power value Pt3, preventing the power transmitting apparatus 100 from correctly detecting a foreign object. As a result, there may be a case where the power transmitting apparatus 100 performs a so-called misdetection, i.e., erroneously determining that a foreign object is placed although no foreign object is placed in a range affected by transmitted power and, as a result, terminates power transmission, whereby the user's use experience degrades. In addition, it may occur that although a foreign object is placed in a range affected by transmitted power, the power transmitting apparatus 100 fails to detect the foreign object, causing the foreign object to generate heat.

A similar event may occur in a case where the power receiving apparatus 102 placed in a range affected by transmitted power has moved over the power transmitting coil 101 of the power transmitting apparatus 100, and thereby the positional relation between the power transmitting coil 101 and the power receiving coil 205 has changed.

It is assumed that the power receiving apparatus 102 has moved from when the power transmitting apparatus 100 received the RPP(1) and stored the point 700 to when the power transmitting apparatus 100 received the RPP(2), and thereby the positional relation between the power transmitting coil 101 and the power receiving coil 205 has changed. Here, it is assumed that the coupling coefficient between the power transmitting coil 101 and the power receiving coil 205 has decreased, as a result of the change in the positional relation. When the coupling coefficient changes in a decreasing direction, the power received by the power receiving apparatus 102 becomes smaller unless the transmitted power has changed before and after the change in the coupling coefficient. The foregoing suggests that, while the power receiving apparatus 102 is receiving a same received power, the decrease of the coupling coefficient must be compensated by increasing the transmitted power with an equivalent degree (i.e., the power transfer efficiency decreases). Conversely, it suggests that, while the power receiving apparatus 102 is receiving a same received power, an increase of the coupling coefficient requires as small a transmitted power as the degree of increase.

In the case of a decreased coupling coefficient, the transmitted power value at the time of receiving the RPP(2)

indicating that the received power value of the power receiving apparatus 102 is Pr2 turns out to be Pt2', which is larger than Pt2 indicating the transmitted power value when the power receiving apparatus 102 does not move (the positional relation between the power transmitting coil 101 and the power receiving coil 205 does not change), as illustrated in FIG. 7B. Here, it may be considered that the power difference between Pt2' and Pt2 is not transferred to the power receiving coil 205 due to decreased efficiency, but is radiated into space which is not illustrated.

Since the line 705 connecting the point 700 and the point 704 at which the transmitted power value is Pt2' and the received power value is Pr2 is calculated and defined as the determination criterion for determining the presence or absence of a foreign object in power-loss-based foreign object detection, it is difficult for the power transmitting apparatus 100 to correctly detect a foreign object, as described above. As a result, the power transmitting apparatus 100 performs a so-called misdetection, i.e., erroneously determining that a foreign object is placed in a range affected by transmitted power although no foreign object is placed therein, and terminating power transmission, whereby the user's use experience degrades. In addition, it may occur that although a foreign object is placed in a range affected by transmitted power, the power transmitting apparatus 100 fails to detect the foreign object, causing the foreign object to generate heat.

Figure 3B:
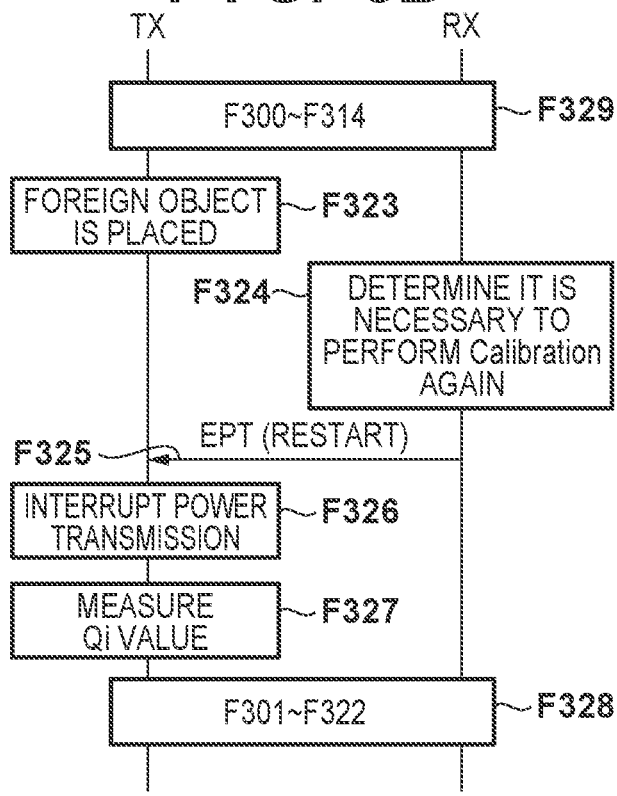

FIG. 4 illustrates a process performed by the determination unit 202 in order to solve the aforementioned problem while the power receiving apparatus 102 according to the present embodiment is performing the Calibration process, and FIG. 3B illustrates the processing sequence thereof.

First, the determination unit 202 of the power receiving apparatus 102 transmits a CE packet while the Calibration process is ongoing (S400, F314). It is assumed that, after the power receiving apparatus 102 has transmitted the CE packet, a foreign object is placed in a range affected by transmitted power (F323).

Each time transmitting a CE packet, the determination unit 202 determines whether or not a re-Calibration process is necessary due to the existence of a foreign object in a range affected by transmitted power (S401). Details of the aforementioned process will be described below, referring to FIG. 5. In a case where the determination unit 202 has determined that the re-Calibration process is necessary (F324, YES at S402), an EPT(Restart) packet that requests for temporal termination of power transmission to the power transmitting apparatus 100, and that also requests to restart transmission of the Digital Ping after a certain time period has elapsed, is transmitted to the power transmitting apparatus 100 (F325, S403). Accordingly, it is possible to request a re-Calibration process. On the other hand, in a case where the determination unit 202 has determined that a re-Calibration process is not necessary (No at S402), the flow returns to the process of S400. The processing by the determination unit 202 is thus completed.

Subsequently, upon receiving the EPT(Restart), the power transmitting apparatus 100 interrupts power transmission (F326). The power transmitting apparatus 100 then performs measurement of the Qi value again (F327), before transmitting the Digital Ping. The power transmitting apparatus 100 then transmits the Digital Ping again, and thereafter the power transmitting apparatus 100 and the power receiving apparatus 102 operate according to the sequence described from F301 to F321 (F328).

However, since there exists a foreign object on this occasion, the power transmitting apparatus 100 responds, to the FOD packet (F308) transmitted by the power receiving apparatus 102, with an NAK indicating that there exists a foreign object (indicating that at least the absence of a foreign object cannot be concluded).

In a case where the power transmitting apparatus 100 has responded with an NAK, the user is provided with a display and/or sound-based notification indicating that there exists a foreign object via a UI (user interface), not illustrated, of the power transmitting apparatus 100 and the power receiving apparatus 102. Subsequently, in a state where the user has removed the foreign object, the power receiving apparatus 102 can perform charging based on the processes from F301 to F321 described above.

As has been described above, in a case where the power receiving apparatus 102 has determined that the power transmitting apparatus 100 is in a state where the power transmitting apparatus 100 cannot correctly perform foreign object detection, performing the Calibration process again allows for supplying power to the load in a state where the power transmitting apparatus 100 can correctly perform foreign object detection.

Although FIG. 3B describes a case where a foreign object is placed in a range affected by transmitted power while the Calibration process is ongoing at F323, the same goes for a case where the power receiving apparatus 102 has moved while the Calibration process is ongoing at F323. In other words, the same goes for a case where the positional relation between the power transmitting coil 101 and the power receiving coil 205 has changed and, as a result, the coupling coefficient between the power transmitting coil 101 and the power receiving coil 205 has changed.

In addition, the power receiving apparatus 102 has determined, in FIG. 3B, that the power transmitting apparatus 100 is in a state where the power transmitting apparatus 100 cannot correctly perform foreign object detection while the Calibration process is ongoing. However, a similar process can be performed even in a state where the Calibration process has completed and the power receiving apparatus 102 is supplying power to the load (F319 to F322). In the following, the aforementioned situation will be described, referring to FIG. 3C.

Figure 3C:
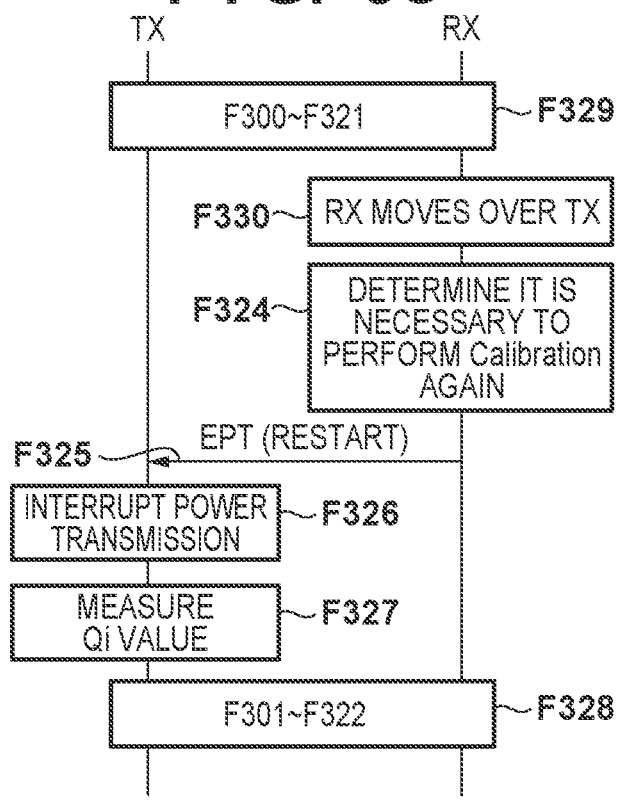

In FIG. 3C, the power receiving apparatus 102 supplies power to the load (F329) based on similar processes (F300 to F321) with FIG. 3A. The power receiving apparatus 102 then moves over the power transmitting apparatus 100 (F330), whereby the coupling coefficient between the power transmitting coil 101 and the power receiving coil 205 changes. Subsequently, the power receiving apparatus 102 determines (F324) that it is necessary to perform the Calibration process again. The power receiving apparatus 102 then transmits the EPT(Restart) packet to the power transmitting apparatus 100 (F325).

Upon receiving the EPT(Restart) (F325), the power transmitting apparatus 100 interrupts power transmission (F326). The power transmitting apparatus 100 then performs measurement of the Qi value again (F327), before transmitting Digital Ping. The power transmitting apparatus 100 then transmits the Digital Ping again. Subsequently, the power transmitting apparatus 100 and the power receiving apparatus 102 operate in accordance with the sequence described in F301 to F322 (F328).

As has been described above, although the power receiving apparatus 102 is in a state of supplying power to the load (F319 to F322), the power receiving apparatus 102 can determine that the power transmitting apparatus 100 is in a state where the power transmitting apparatus 100 cannot correctly detect a foreign object. Subsequently, by performing the Calibration process again, it is possible to supply power to the load in a state where the power transmitting apparatus 100 can correctly detect a foreign object.

<Change in Direct Current Voltage Vrect Due to Movement of Foreign Object and Power Receiving Apparatus 102>

Next, there will be described a change in the direct current voltage Vrect when a foreign object is placed in a range affected by transmitted power, and when the power receiving apparatus 102 has moved in the range affected by transmitted power.

When a foreign object is placed in a range affected by transmitted power, the transmitted power is consumed by the power receiving apparatus 102 and the foreign object. Here, it goes without saying that the transmitted power is consumed only by the power receiving apparatus 102 before the foreign object is placed. Since the transmitted power neither increases nor decreases, the direct current voltage Vrect decreases when the foreign object is placed.

In a case where the power receiving apparatus 102 placed in a range affected by transmitted power has moved, the change in the direct current voltage Vrect differs depending on the increase or decrease of the coupling coefficient between the power transmitting coil 101 and the power receiving coil 205. In a case where the power receiving apparatus 102 has moved in an increasing direction of the coupling coefficient, it facilitates more transmitted power to be transferred from the power transmitting coil 101 to the power receiving coil 205, whereby the direct current voltage Vrect increases provided that the transmitted power remains constant before and after the movement. On the other hand, in a case where the power receiving apparatus 102 has moved in a decreasing direction of the coupling coefficient, it makes the transmitted power difficult to be transferred from the power transmitting coil 101 to the power receiving coil 205, and therefore the direct current voltage Vrect decreases provided that the transmitted power remains constant before and after the movement.

<Relation Between CE Packet and Change in Direct Current Voltage Vrect>

Figure 6:
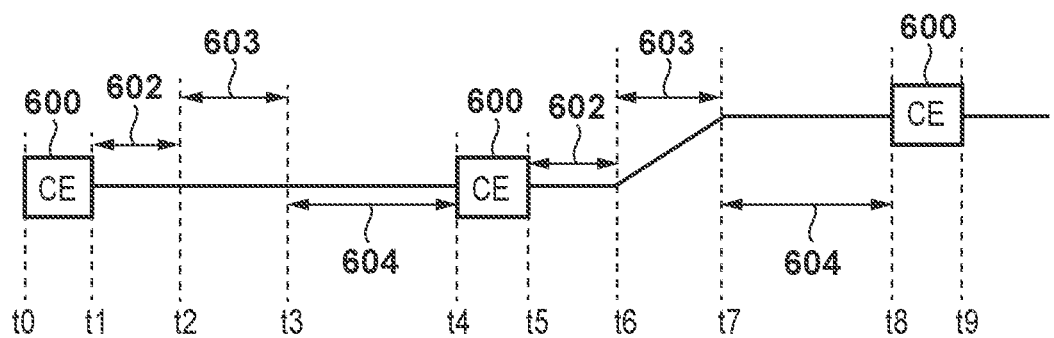
FIG. 6 is a timing chart pertaining to an operation of a determination unit of a power receiving apparatus according to an embodiment.

Next, there will be described, referring to FIG. 6, a relation between the CE packet and the direct current voltage Vrect output from the rectification unit 203 to the voltage control unit 211. In FIG. 6, the horizontal axis indicates time, and the vertical axis indicates the direct current voltage Vrect. The power receiving apparatus 102 periodically transmits a CE packet 600 to the power transmitting apparatus 100 in time periods t0 to t1, t4 to t5, and t8 to t9. After a time period 602 has elapsed since reception of the CE packet, the power transmitting apparatus 100 adjusts the transmitted power based on the CE packet in time periods 603 (t2 to t3 and t6 to t7). The power transmitting apparatus 100 does not adjust power transmission during time periods 602 (0 to t2 and t5 to t6) immediately after reception of the CE packet and time periods 604 (t3 to t4 and t7 to t8) immediately after adjustment of transmitted power. In other words, the direct current voltage Vrect does not vary and is stable during the interval between the time period 602 and the time period 604 provided that power consumption of the load of the power receiving apparatus 102 is constant.

Next, there will be described the CE packet and the change assumed in the direct current voltage Vrect. In a case where the CE packet transmitted by the power receiving apparatus 102 and received by the power transmitting apparatus 100 in the time period t0 to t1 is a CE(0), which is a packet requesting maintaining of transmitted power, the power transmitting apparatus 100 does not adjust the transmitted power during the time period t2 to t3. Therefore, the direct current voltage Vrect does not change during the time period t2 to t3.

In a case where the CE packet transmitted by the power receiving apparatus 102 and received by the power transmitting apparatus 100 in the time period t4 to t5 is a CE(+), which is a packet requesting increase of transmitted power, the power transmitting apparatus 100 increases the transmitted power in the time period t6 to t7. As a result, the direct current voltage Vrect increases in the time period t6 to t7.

Additionally, in a case where the CE packet is CE(−) requesting decrease of transmitted power, although not illustrated, the power transmitting apparatus 100 decreases the transmitted power. As a result, the direct current voltage Vrect decreases in the time period 603.

It suffices to measure the direct current voltage Vrect during a time period in which the voltage value is stable from when the power transmitting apparatus 100 has adjusted the transmitted power to when the next adjustment of transmitted power is requested.

<Operation of Determination Unit 202>

Based on the foregoing description, there will be described, referring to FIG. 5, details of a determination process (S401) of whether or not the re-Calibration process to be performed by the determination unit 202 is necessary.

The CE indicated by reference numeral 509 is an item pertaining to adjustment of transmitted power requested by the CE packet. A CE of "−" indicates that the power receiving apparatus 102 is requesting decrease of transmitted power, "0" indicates maintaining of transmitted power, and "+" indicates increase of transmitted power. The items of ΔVrect indicated by reference numeral 510 are the difference between values of the direct current voltage Vrect immediately before and immediately after reception of the CE packet. Specifically, it is the difference between the Vrect measured by the power receiving apparatus 102 in the time period t3 to t4 immediately preceding the CE received in the time period t4 to t5 illustrated in FIG. 6, and the Vrect measured in the immediately following time period t7 to t8. A ΔVrect of "+" indicates that the value of Vrect immediately following the CE has increased relative to the immediately preceding Vrect. A ΔVrect of "0" indicates that the value of Vrect immediately following the CE has neither increased nor decreased relative to the immediately preceding Vrect. A ΔVrect of "−" indicates that the value of Vrect immediately following the CE has decreased relative to the immediately preceding Vrect.

In addition, the items of re-Calibration indicated by reference numeral 511 are details of determination performed by the determination unit 202 based on the CE 509 and ΔVrect 510. When the re-Calibration process is "necessary", the determination unit 202 determines that the re-Calibration process is necessary, or determines it to be unnecessary when "unnecessary."

For example, according to case 500, the power receiving apparatus 102 is requesting the power transmitting apparatus 100 to reduce the transmitted power (CE is "−"). As a result, the ΔVrect has decreased (Vrect is "−"). The foregoing being an expected operation, the determination unit 202 determines that the re-Calibration process is "unnecessary."

According to case 501, the power receiving apparatus 102 is requesting the power transmitting apparatus 100 to reduce the transmitted power (CE is "−"). A result is that, the ΔVrect has not changed (ΔVrect is "0"). The foregoing may occur in the following case.

Based on the result of the CE packet, the power transmitting apparatus 100 has reduced the transmitted power (ΔVrect is expected to be "−").

Furthermore, the power receiving apparatus 102 has moved in an increasing direction of the coupling coefficient. (ΔVrect is expected to be "+").

As has been already explained, since the foregoing is a state where the power receiving apparatus 102 has moved and thereby the positional relation between the power transmitting coil 101 and the power receiving coil 205 has changed (the coupling coefficient has changed), the power transmitting apparatus 100 cannot correctly detect a foreign object. The determination unit 202 therefore determines that the re-Calibration process is "necessary."

According to case 502, the power receiving apparatus 102 is requesting the power transmitting apparatus 100 to reduce the transmitted power (CE is "−"). A result is that, the ΔVrect has increased (ΔVrect is "+"). The foregoing may occur in the following case.

Based on the result of the CE packet, the power transmitting apparatus 100 has reduced transmitted power (ΔVrect is expected to be "−").

Furthermore, the power receiving apparatus 102 has moved in an increasing direction of the coupling coefficient. (ΔVrect is expected to be "+").

Since the foregoing is the same as case 501, the determination unit 202 determines that the re-Calibration process is "necessary."

According to case 503, the power receiving apparatus 102 is requesting the transmitting apparatus 100 to maintain the transmitted power (CE is "0"). A result is that, the ΔVrect has decreased (ΔVrect is "−"). The foregoing may occur in the following case.

Based on the result of the CE packet, the power transmitting apparatus 100 neither increases nor decreases the transmitted power (ΔVrect is expected to be "0").

Furthermore, the power receiving apparatus 102 has moved in a decreasing direction of the coupling coefficient. (ΔVrect is expected to be "−").

Since the foregoing is a state where the power receiving apparatus 102 has moved and thereby the positional relation between the power transmitting coil 101 and the power receiving coil 205 has changed (the coupling coefficient has changed), the determination unit 202 determines that the re-Calibration process is "necessary".

Furthermore, the case 503 may also occur in a case where a foreign object is placed in a range that affects transmitted power. This is because, as has been already explained, ΔVrect is expected to be "−" also in a case where a foreign object is placed.

According to case 504, the power receiving apparatus 102 is requesting the power transmitting apparatus 100 to maintain the transmitted power (CE is "0"). A result is that, the ΔVrect has not changed (ΔVrect is "0"). The foregoing may occur in the following case.

Based on the result of the CE packet, the power transmitting apparatus 100 neither increases nor decreases the transmitted power (ΔVrect is expected to be "0").

Furthermore, there is neither placement of a foreign object nor movement of the power receiving apparatus 102 (ΔVrect is expected to be "0").

In this case, the determination unit 202 determines that the re-Calibration process is "unnecessary."

According to case 505, the power receiving apparatus 102 is requesting the power transmitting apparatus 100 to maintain the transmitted power (CE is "0"). A result is that, the ΔVrect has increased (ΔVrect is "+"). The foregoing may occur in the following case.

Based on the result of the CE packet, the power transmitting apparatus 100 neither increases nor decreases the transmitted power (ΔVrect is expected to be "0").

Furthermore, the power receiving apparatus 102 has moved in an increasing direction of the coupling coefficient. (ΔVrect is expected to be "+").

Since the foregoing is a state where the power receiving apparatus 102 has moved and thereby the positional relation between the power transmitting coil 101 and the power receiving coil 205 has changed (the coupling coefficient has changed), the determination unit 202 determines that the re-Calibration process is "necessary."

According to case 506, the power receiving apparatus 102 is requesting the power transmitting apparatus 100 to increase the transmitted power (CE is "+"). A result is that, the ΔVrect has decreased (ΔVrect is "−"). The foregoing may occur in the following case.

Based on the result of the CE packet, the power transmitting apparatus 100 increases the transmitted power (ΔVrect is expected to be "+").

Furthermore, the power receiving apparatus 102 has moved in a decreasing direction of the coupling coefficient. (ΔVrect is expected to be "−").

Since the foregoing is a state where the power receiving apparatus 102 has moved and the positional relation between the power transmitting coil 101 and the power receiving coil 205 has changed (the coupling coefficient has changed), the determination unit 202 determines that the re-Calibration process is "necessary."

Furthermore, the case 506 may also occur in a case where a foreign object is placed in a range affected by transmitted power. This is because ΔVrect is expected to be "−" also in a case where a foreign object is placed, as has been already explained.

According to case 507, the power receiving apparatus 102 is requesting the power transmitting apparatus 100 to increase the transmitted power (CE is "+"). A result is that, the ΔVrect has not changed (ΔVrect is "0"). The foregoing may occur in the following case.

Based on the result of the CE packet, the power transmitting apparatus 100 increases the transmitted power (ΔVrect is expected to be "+").

Furthermore, the power receiving apparatus 102 has moved in a decreasing direction of the coupling coefficient. (ΔVrect is expected to be "−").

Since the foregoing is a state where the power receiving apparatus 102 has moved and thereby the positional relation between the power transmitting coil 101 and the power receiving coil 205 has changed (the coupling coefficient changed), the determination unit 202 determines that the re-Calibration process is "necessary."

According to case 508, the power receiving apparatus 102 is requesting the power transmitting apparatus 100 to increase the transmitted power (CE is "+"). A result is that, the ΔVrect has increased (ΔVrect is "+"). The foregoing may occur in the following case.

Based on the result of the CE packet, the power transmitting apparatus 100 increases the transmitted power (ΔVrect is expected to be "+").

Furthermore, there is neither placement of a foreign object nor movement of the power receiving apparatus 102 (ΔVrect is expected to be "0").

In this case, the determination unit 202 determines that the re-Calibration process is "unnecessary."

As has been described above, the power receiving apparatus 102 can determine whether or not the re-Calibration process is necessary, based on information pertaining to adjustment of transmitted power requested by the CE packet and measurement values of the Vrect before and after transmission of the CE packet. As a result, it is possible to perform the re-Calibration process based on the flow of FIG. 4 and the sequences of FIGS. 3A to 3C, and set the power transmitting apparatus 100 in a state where it can correctly perform foreign object detection.

Furthermore, it is possible to reduce the so-called misdetection by the power transmitting apparatus 100, i.e., erroneously determining that a foreign object is placed in a range affected by transmitted power although no foreign object is placed therein, and terminating power transmission. Therefore, it is possible to realize a comfortable use without impairing the user's use experience. In addition, it is possible to prevent the power transmitting apparatus 100 from failing to detect a foreign object although the foreign object is placed in a range affected by transmitted power, and causing the foreign object to generate heat.

Although it has been explained in FIG. 5 that CE 509 is "+", "0", or "−", there may be provided a certain degree of margin with respect to "0". Specifically, CE 509 being "larger than +x", "from +x to −x", or "smaller than −x" brings about a similar effect. Here, x may be an arbitrary value.

Similarly, although it has been explained that ΔVrect 510 is "+", "0", or "−", there may be provided a certain degree of margin with respect to "0". Specifically, ΔVrect 510 being "larger than +y", "from +y to −y", or "smaller than −y" brings about a similar effect. Here, y may be an arbitrary value. In other words, it may be determined that there is neither increase nor decrease of the voltage value in a case where the difference between voltage values is within a predetermined range.

In addition, at least a part of the processes illustrated in the sequences of FIGS. 3A to 3C and the flowchart of FIG. 4 may be implemented by hardware. When processes are implemented by hardware, it suffices to automatically generate a dedicated circuit on the FPGA from a program implementing each step, using a predetermined compiler, for example. FPGA is an abbreviation for Field Programmable Gate Array. In addition, a Gate Array circuit may be formed in a similar manner to FPGA and implemented as hardware.

According to various embodiments of the present disclosure, it becomes possible to perform detection of an object which is different from a power receiving apparatus in wireless power transfer with a high precision.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-049939, filed Mar. 19, 2020, which is hereby incorporated by reference herein in its entirety.

What is claimed is:

1. A power receiver comprising:
one or more memories storing instructions; and
one or more processors executing the instructions to:
measure a first voltage value based on power wirelessly received from a power transmitter, the power transmitter having a detection function for detecting an object different from the power receiver based on a difference between power transmitted by the power transmitter and the power wirelessly received by the power receiver;
request the power transmitter to adjust the transmitted power;
measure a second voltage value based on the power wirelessly received from the power transmitter after the request is performed; and
notify, based on the request and a difference between the first voltage value and the second voltage value, the power transmitter to perform a calibration process related to the detection function.

2. The power receiver according to claim 1, wherein the one or more processors further execute the instructions to determine whether or not the calibration process is necessary, based on details of the request and the difference between the first voltage value and the second voltage value, and
in a case where the calibration process is determined to be necessary, the power transmitter is notified to terminate the power transmission and to perform the calibration process.

3. The power receiver according to claim 2, wherein the calibration process is determined to be necessary, in a case where the adjustment of the transmitted power is decreasing the transmitted power, and the second voltage value is not decreased relative to the first voltage value.

4. The power receiver according to claim 2, wherein the calibration process is determined to be necessary, in a case where the adjustment of the transmitted power is increasing the transmitted power, and the second voltage value is not increased relative to the first voltage value.

5. The power receiver according to claim 2, wherein the calibration process is determined to be necessary, in a case where the adjustment of the transmitted power is maintaining the transmitted power, and the second voltage value is increased or decreased relative to the first voltage value.

6. The power receiver according to claim 1, wherein the second voltage value is measured during a time period in which a voltage value is stable from when the power transmitter adjusted the transmitted power last time to when the request of adjustment of the transmitted power is performed next time.

7. The power receiver according to claim 1, wherein the power transmitter is notified to perform the calibration process, while the power receiver is providing to a load, the power wirelessly received from the power transmitter.

8. The power receiver according to claim 7, wherein the load comprises a battery.

9. The power receiver according to claim 1, wherein the power transmitter is notified to perform the calibration process, by notifying the power transmitter to restart transmission of digital Ping defined in Wireless Power Consortium (WPC) standard after a time period has elapsed since the termination of the power transmission.

10. The power receiver according to claim 1, wherein, in a case where the difference between the second voltage value and the first voltage value is within a predetermined range, the one or more processors further execute the instructions to determine that there is neither increase nor decrease from the first voltage value to the second voltage value.

11. The power receiver according to claim 1, wherein the power transmitter is notified to terminate power transmission and to perform the calibration process based on the request and the difference between the first voltage and the second voltage value.

12. The power receiver according to claim 1, wherein the first voltage value is measured during a time period in which a voltage value is stable from when the power transmitter adjusted the transmitted power last time to when the request of adjustment of the transmitted power is performed.

13. A control method of a power receiver, the method comprising:

measuring a first voltage value based on power wirelessly received from a power transmitter, the power transmitter having a detection function for detecting an object different from the power receiver based on a difference between power transmitted by the power transmitter and the power wirelessly received by the power receiver;

requesting the power transmitter to adjust the transmitted power;

measuring a second voltage value based on the power wirelessly received from the power transmitter after the requesting is performed; and notifying, based on the request and a difference between the first voltage value and the second voltage value, the power transmitter to perform a calibration process related to the detection function.

14. A non-transitory computer-readable storage medium storing a computer program for causing a computer to execute a control method of a power receiver, the method comprising:

measuring a first voltage value based on power wirelessly received from a power transmitter, the power transmitter having a detection function for detecting an object different from the power receiver based on a difference between power transmitted by the power transmitter and the power wirelessly received by the power receiver;

requesting the power transmitter to adjust the transmitted power;

measuring a second voltage value based on the power wirelessly received from the power transmitter after the requesting is performed; and notifying, based on the request and a difference between the first voltage value and the second voltage value, the power transmitter to perform a calibration process related to the detection function.

\* \* \* \* \*